United States Patent
Matsui et al.

(10) Patent No.: US 8,247,934 B2
(45) Date of Patent: Aug. 21, 2012

(54) COOLING STRUCTURE FOR ELECTRIC ROTATING MACHINE

(75) Inventors: Hirohito Matsui, Okazaki (JP); Sadahisa Onimaru, Chiryu (JP); Shinji Kouda, Kariya (JP); Ryosake Utaka, Takahama (JP); Munehiro Kamiya, Toyota (JP); Hiroshi Kaneiwa, Chiryu (JP)

(73) Assignees: Nippon Soken, Inc., Nishio (JP); Denso Corporation, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 162 days.

(21) Appl. No.: 12/764,231

(22) Filed: Apr. 21, 2010

(65) Prior Publication Data

US 2010/0264760 A1 Oct. 21, 2010

(30) Foreign Application Priority Data

Apr. 21, 2009 (JP) ................................. 2009-103032

(51) Int. Cl.
*H02K 9/00* (2006.01)
(52) U.S. Cl. ............................... 310/54; 310/53; 310/57
(58) Field of Classification Search .................... 310/52, 310/54, 57, 60 A, 53
See application file for complete search history.

(56) References Cited

U.S. PATENT DOCUMENTS 6,515,384 B1 2/2003 Kikuchi et al.

FOREIGN PATENT DOCUMENTS

| JP | 2001-145302 | | 5/2001 |
| JP | 2003324901 A | * | 11/2003 |
| JP | 2004-180376 | | 6/2004 |
| WO | WO 2008108351 A1 | * | 9/2008 |

OTHER PUBLICATIONS

Machine translation JP2003324901 (2003).*

* cited by examiner

*Primary Examiner* — Quyen Leung
*Assistant Examiner* — Jose Gonzalez Quinones
(74) *Attorney, Agent, or Firm* — Nixon & Vanderhye PC

(57) ABSTRACT

The electric rotating machine includes a rotor relatable around a rotating shaft disposed horizontally, a stator core formed with slots, and a stator coil constituted of in-slot portions each of which is accommodated in a corresponding one of the slots, and turn portions each of which connects corresponding adjacent two of the in-slot portions at a position outside the stator core. The turn portions form a coil end projecting axially outward from an end surface of the stator core at each of both axial end sides of the stator core. The coil end is formed in a cylindrical shape including an axial end surface of a flat shape, and inner and outer peripheral surfaces of a circular shape. The electric rotating machine further includes a coolant supply section to supply coolant to an upper part of the outer peripheral surface of the coil end.

11 Claims, 10 Drawing Sheets

COOLING STRUCTURE FOR ELECTRIC ROTATING MACHINE

CROSS-REFERENCE TO RELATED APPLICATION

This application is related to Japanese Patent Application No. 2009-103032 filed on Apr. 21, 2009, the contents of which are hereby incorporated by reference.

BACKGROUND OF THE INVENTION

1. Field of the Invention

The present invention relates to an electric rotating machine used as a motor or an alternator in a vehicle.

2. Description of Related Art

Generally, a vehicle-mounted electric rotating machine includes a rotor rotatable around a rotating shaft, a stator core formed with slots arranged along the circumferential direction of the stator core so as to face the outer periphery of the rotor, and a stator coil constituted of a plurality of coil wires wound around the slots. The coil wire includes in-slot portions accommodated in the slots which are different in their circumferential positions, and turn portions each connecting two adjacent ones of the coil wires. The turn portions form a coil end at each of both axial ends of the stator coil, the coil end projecting axially outward from the end surface of the stator coil.

Since the stator coil of the electric rotating machine having such a structure increases in temperature when it operates, various countermeasures for the temperature increase have been proposed. For example, Japanese Patent Application Laid-open No. 2001-195302 (Patent document 1) describes installing an oil jacket on each of both end surfaces of the stator core so as to surround the coil end, providing an oil chamber between the oil jacket and the end surface, and passing coolant to the oil chamber to cool the coil end.

Further, Japanese Patent Application Laid-open No. 2004-180376 (Patent document 2) describes disposing, above the coil end, a gutter including a coolant supply opening through which coolant to be supplied to the surface of the coil end is taken and a guide connected to the coolant supply opening to guide coolant discharged from the coolant supply opening in order that coolant is guided to a desired direction to efficiently cool the coil end.

In the case of Patent document 1, the coolant passage is a closed space, and when the oil chamber is filled with coolant, the entire surface of the coil end becomes wet by coolant so that it is cooled. However, the cooling structure described in Patent document 1 needs a coolant supply pump, because the coolant passage has a relatively large fluid resistance. This increases manufacturing cost.

In the case of Patent document 2, since coolant flowing in from the coolant supply opening and flowing out from the guide flows down on the surface of the coil end by the action of the gravity, it is likely that some parts of the surface of the coil end do not become wet, causing the cooling to be non-uniform. Generally, the envelope surface of a coil end of a stator of an electric rotating machine is not flat, and accordingly, the non-uniform cooling tends to occur easily.

SUMMARY OF THE INVENTION

The present invention provides an electric rotating machine comprising:

a rotor rotatable around a rotating shaft disposed horizontally;

a stator core formed with a plurality of slots arranged in a circumferential direction of the stator core so as to be opposed to a peripheral surface of the rotor; and a stator coil constituted of a plurality of in-slot portions each of which is accommodated in a corresponding one of the plurality of the slots, and a plurality of turn portions each of which connects corresponding adjacent two of the plurality of the in-slot portions at a position outside the stator core, the plurality of the turn portions forming a coil end projecting axially outward from an end surface of the stator core at each of both axial end sides of the stator core, the coil end being formed in a cylindrical shape including an axial end surface of a flat shape, and inner and outer peripheral surfaces of a circular shape; and a coolant supply section to supply coolant to an upper part of the outer peripheral surface of the coil end.

According to the present invention, it is possible to significantly improve the coil cooling performance of an electric rotating machine having means for cooling its coil ends using the action of gravity at low cost.

Other advantages and features of the invention will become apparent from the following description including the drawings and claims.

BRIEF DESCRIPTION OF THE DRAWINGS

In the accompanying drawings:

FIG. 123 is a cross-sectional view of FIG. 11 taken along the XIII-XIII line;

PREFERRED EMBODIMENTS OF THE INVENTION

First Embodiment

Figure 1:
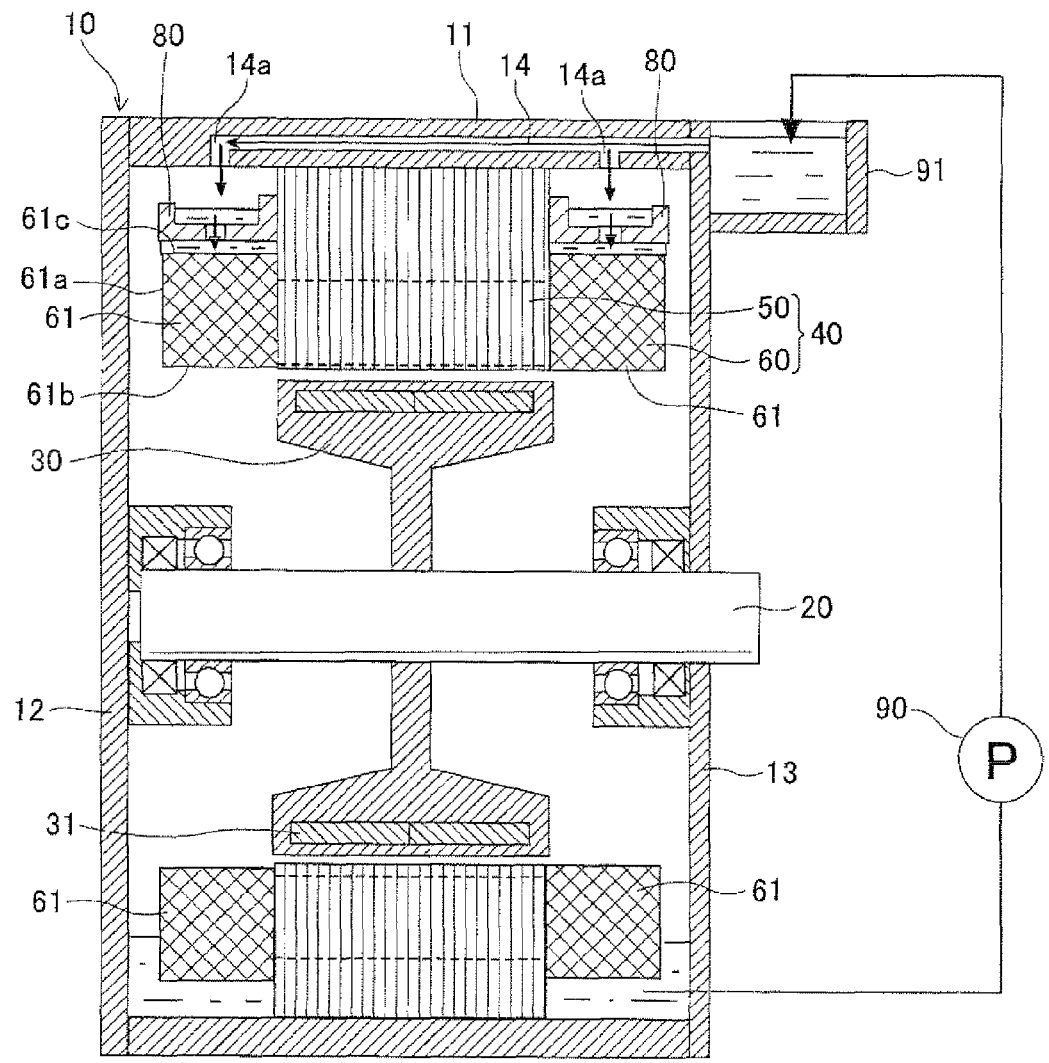
FIG. 1 is an axial cross-sectional view of an electric rotating machine according to a first embodiment of the invention.

An electric rotating machine according to a first embodiment of the invention is described with reference to FIGS. 1 to 10. As shown in FIG. 1, the electric rotating machine of this embodiment includes a housing 10, a rotating shaft 20, a rotor 30, a stator 40, a coolant supply section 80, and a pump 90. The housing 10 is constituted of a main body section 11 of a cylindrical shape, and lid sections 12 and 13 closing both opening ends of the main body section 11. The rotating shaft 20 is rotatably supported by the housing 10 through bearings 21 and 22. The rotor 30 is fixed to the rotating shaft 20. The stator 40 is constituted of a stator core 50 fixed to the housing 10 so as to surround the rotor 30 inside the housing 10, and a stator coil 60 wound around the stator core 50. The coolant supply section 80 supplies coolant to the coil ends 61 of the stator coil 60. The pump 90 feeds coolant to the coolant supply section 80. The electric rotating machine of this embodiment is placed such that the rotating shaft 20 is parallel to the horizontal direction in normal use.

The rotor 30 is provided with a plurality of permanent magnets 31 at its outer periphery facing the inner periphery of the stator core 50 such that different magnetic polarities alternate along the circumferential direction. In this embodiment, 8-pole rotor (four N poles and four S poles) is used as the rotor 30.

Figure 2A:
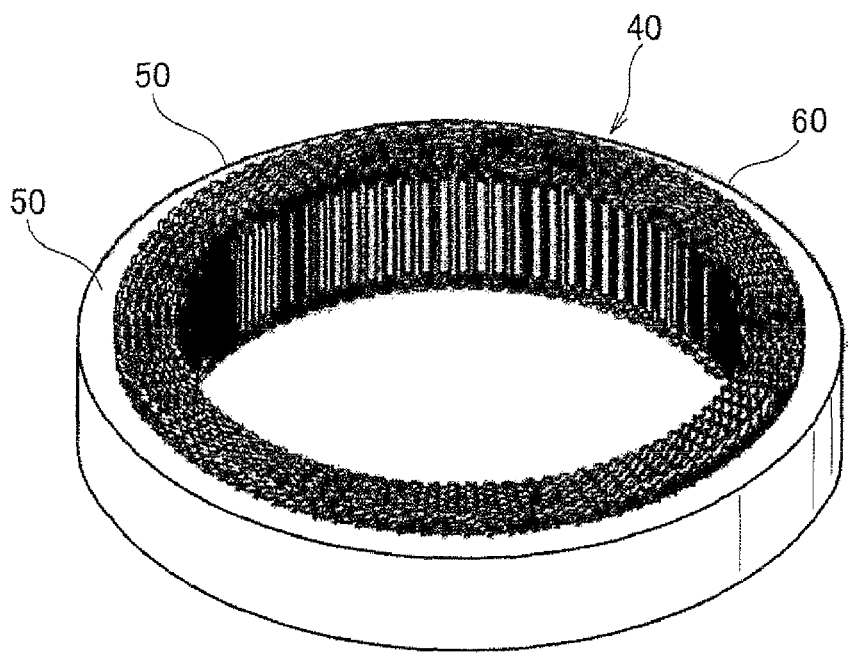
FIG. 2A is a perspective vies of a stator of the electric rotating machine of the first embodiment.
Figure 2B:
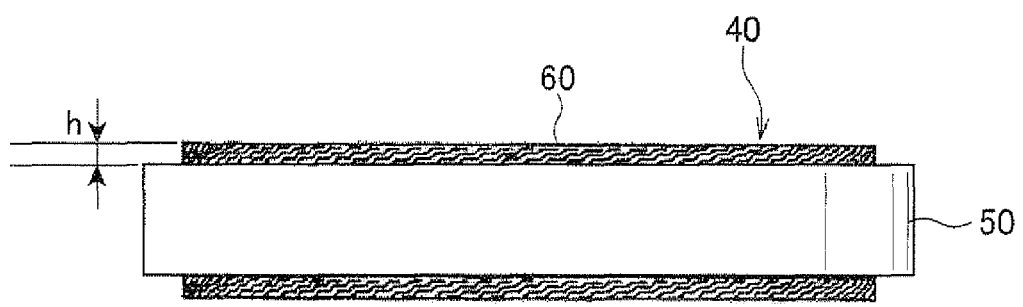
FIG. 2B is a side view of the stator of the electric rotating machine of the first embodiment.
Figure 3:
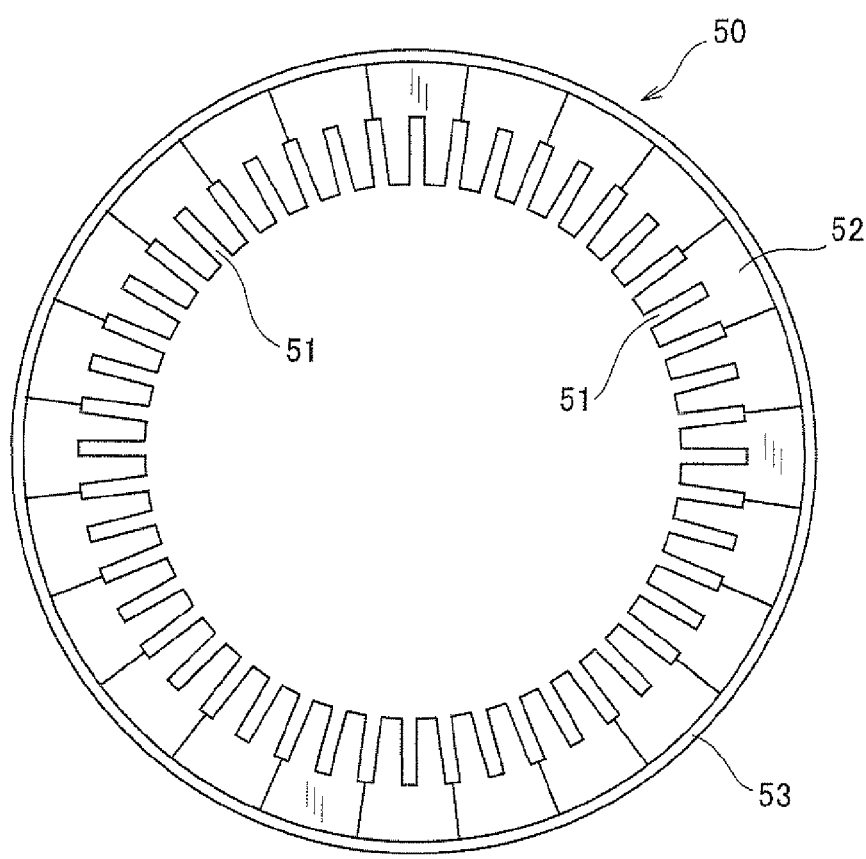
FIG. 3 is a front view of a stator core of the stator of the electric rotating machine of the first embodiment.

As shown in FIG. 2A, the stator 40 is constituted of the stator core 50 and a three-phase stator coil 60 formed by winding a plurality of coil wires 70 around the stator core 50. As shown in FIG. 3, the stator core 50 has a shape of a circular ring formed with a plurality of slots 51 at its inner periphery. The depth direction of the respective slots 51 coincides with the radial direction of the stator core 50. The slots 51 are formed by two in number per each magnetic pole of the rotor 30 per each phase of the stator coil 60. In this embodiment, the total number of the slots formed in the stator core 50 is 48 (=8 (poles)×3 (phases)×2).

Figure 4:
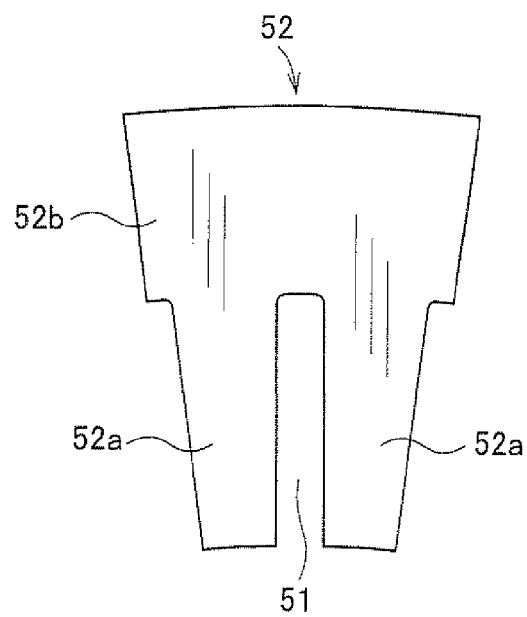
FIG. 4 is a plan view of one of split cores constituting the stator core of the electric rotating machine of the first embodiment.

The stator core 50 is constituted of a predetermined number of (24, in this embodiment) split cores 52 shown in FIG. 4 which are joined in a ring. The split cores 52 are formed by laminating a plurality of electromagnetic steel plates. The split core 52 has such a shape that it defines one slot 51 by itself, and defines another slot 51 with the circumferentially adjacent split core 52. In this embodiment, each split core 52 includes a pair of tooth portions 52a which extend radially inward, and a back core portion 52b connecting the tooth portions 52a at radially outside. The split cores 52 are kept in the shape of a circular ring by an outer casing 53 fitted to the outer periphery of the ring.

The stator coil 60 is formed in a cylindrical shape by spirally winding a wire combination formed by interlacing a plurality of wave-shaped coil wires 70 (see FIG. 5) into a band-like shape.

Figure 6:
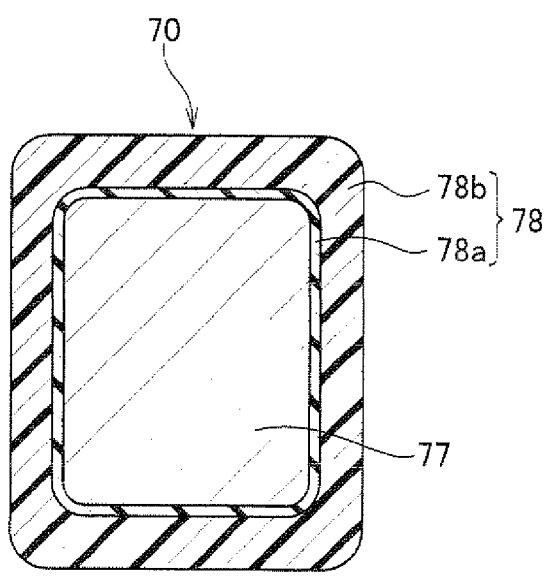
FIG. 6 is a cross sectional view of the coil wire shown in FIG. 5.

As shown in FIG. 6, the coil wire 70 has a rectangular cross section, and is constituted of a copper conductor 77 and an insulating film 78 covering the outer surface of the copper conductor 77. The insulating film 78 is constituted of an inner layer 78a and an outer layer 78b. The thickness of the insulating film 78 is between 100 µm-200 µm. Since the insulating film 78 is sufficiently thick, it is not necessary to interpose insulating paper or the like between each neighboring coil wires 70 for insulation therebetween. However, insulating paper or the like may be interposed between each neighboring coil wires 70, or between the stator core 50 and the stator coil 60.

The outer layer 78b is made of insulating material such as nylon, and the inner layer 78a is made of insulating material having a glass transition temperature higher than that of the outer layer 78b such as thermoplastic resin or polyamideimide. Accordingly, since the outer layer 78b crystallizes more rapidly than the inner layer 78a when the electric rotating machine generates heat, the surface hardness of the outer layer 78b increases, and accordingly, the coil wire 70 is hard to scratch.

Figure 5:
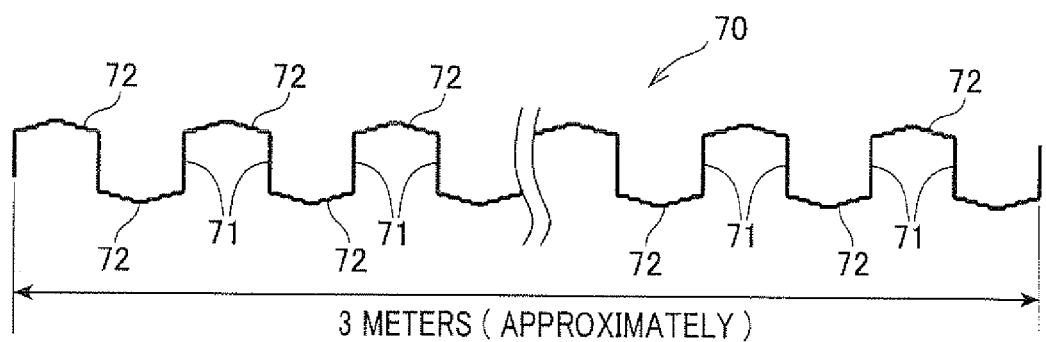
FIG. 5 is a front view of a coil wire used to constitute a stator coil of the electric rotating machine of the first embodiment.

As shown in FIG. 5, each of the coil wires 70 is formed in a wave shape including in-slot portions 71 arranged along the longitudinal direction to be accommodated in the slots 51 of the stator core 50, and turn portions 72 each connecting two adjacent ones of the in-slot portions 71 at their one ends or at their other ends. The coil wires 70 are wave-wound around the stator core 50 to constitute the stator coil 60. The turn portions 72 project axially outward from the end surfaces of the stator coil 60, forming a coil end 61 at each of both axial ends of the stator coil 60 (see FIG. 1). As shown in FIG. 1, the coil end 61 has a cylindrical shape including a flat axial end surface 61a, an inner circular peripheral surface 61b, and an outer circular peripheral surface 61c.

Figure 7:
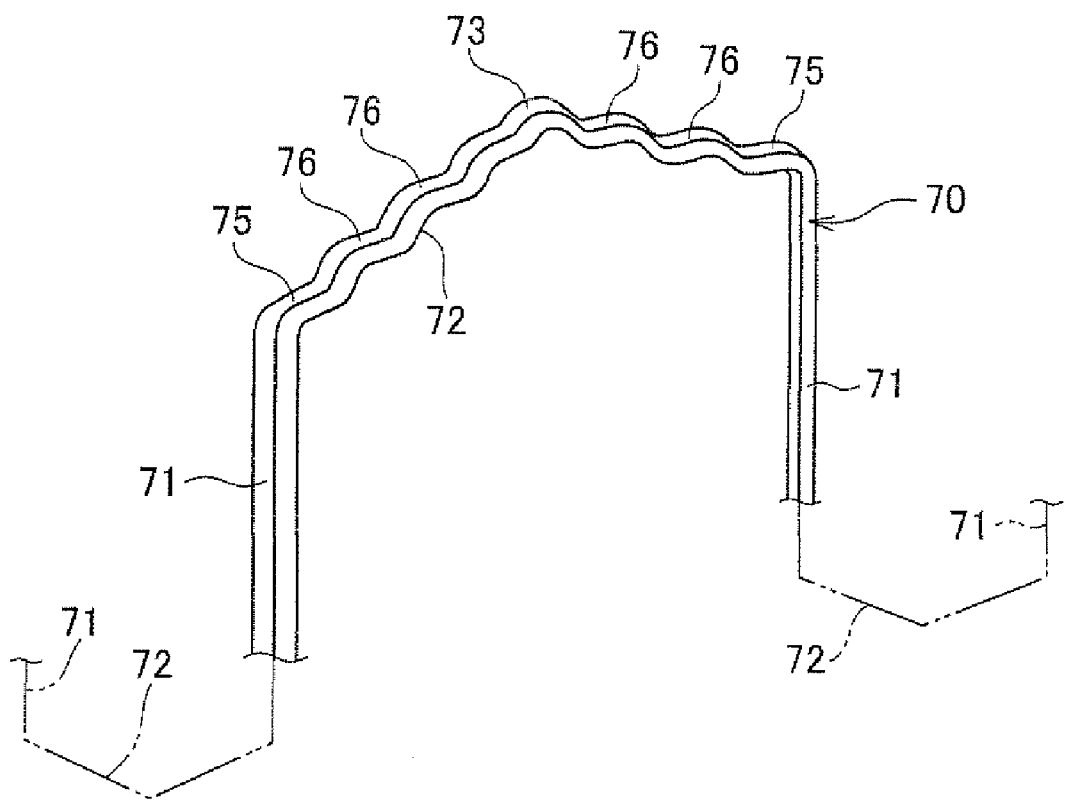
FIG. 7 is a perspective view showing a turn portion of the coil wire shown in FIG. 5.

As shown in FIG. 7, the turn portion 72 has an apex portion 73 as a portion most distant from the end surface of the stator core 60 in the axial outward direction. The apex portion 73 is formed in a crank-like shape extending in the direction parallel to the end surface of the stator core 50. The crank height of the crank-like shape is approximately half the width of the coil wire 70, so that the turn portions 72 adjacent in the radial direction can be disposed intimately to each other. This makes it possible to prevent the stator coil 60 from projecting radially outward, because the radial width of the coil end 61 can be reduced.

The turn portion 72 also has a step portion 75 formed at each of the positions at which it projects outside from the adjacent two slots 51 through which the same coil wire 70 passes, the step portion 75 extending along the axial end surface of the stator core 50. Accordingly, the distance between the positions at which the turn portion 72 projects outside from the two slots 51, that is, the length of the base of the triangle formed by the turn portion 72 is shorter than the distance between the two slots 51 across which the coil wire 70 strides. This makes it possible to reduce the height (axial length) of the coil end 61.

When the length of the step portion 75 along the end surface of the stator core 50 is d1, and the slot pitch (the distance between the circumferentially adjacent slots) is d2, the relationship of $d1 \leq d2$ holds. This makes it possible to prevent the step portion 75 of the coil wire 70 from interfering with another coil wire 70 projecting outside from the circumferentially adjacent slot. Hence, according to this embodiment, it is unnecessary to increase the height of the coil end 61 or radial width of the coil end 61 in order to prevent the coil wires 70 projecting outside from the circumferentially adjacent slots from interfering with each other. Further, since the radial width of the coil end 61 can be reduced, the stator coil 60 can be prevented from projecting axially outward.

The turn portion 72 has also two step portions 76 formed between the apex portion 73 and each of the step portions 75. That is, each turn portion 72 includes one apex portion 73 and six turn portions 75 and 76.

According to this embodiment, the height of the turn portion 72 can be made smaller than conventional configurations in which the turn portion has a triangular shape formed with no step portion. Like the step portion 75, the step portion 76 is formed to extend in the direction parallel to the end surface of the stator core 50. Accordingly, the turn portion 72 has a staircase shape in which the steps descents to both sides thereof from the apex portion 73.

The coil wire 70 including the turn portions 72 having such a staircase shape is accommodated in every predetermined number of the slots 51 (every 6 (=3 phase×2) slots 51 in this embodiment) such that the turn portions 72 project from both the axial end surface of the stator core 50. The turn portions 72 projecting from the axial end surface of the stator core 50 form the coil end 61 of the stator coil 60. The coil end 61 has a cylindrical shape including the flat axial end surface 61a, and circular inner and outer peripheral surfaces 61b and 61c.

Figure 8:
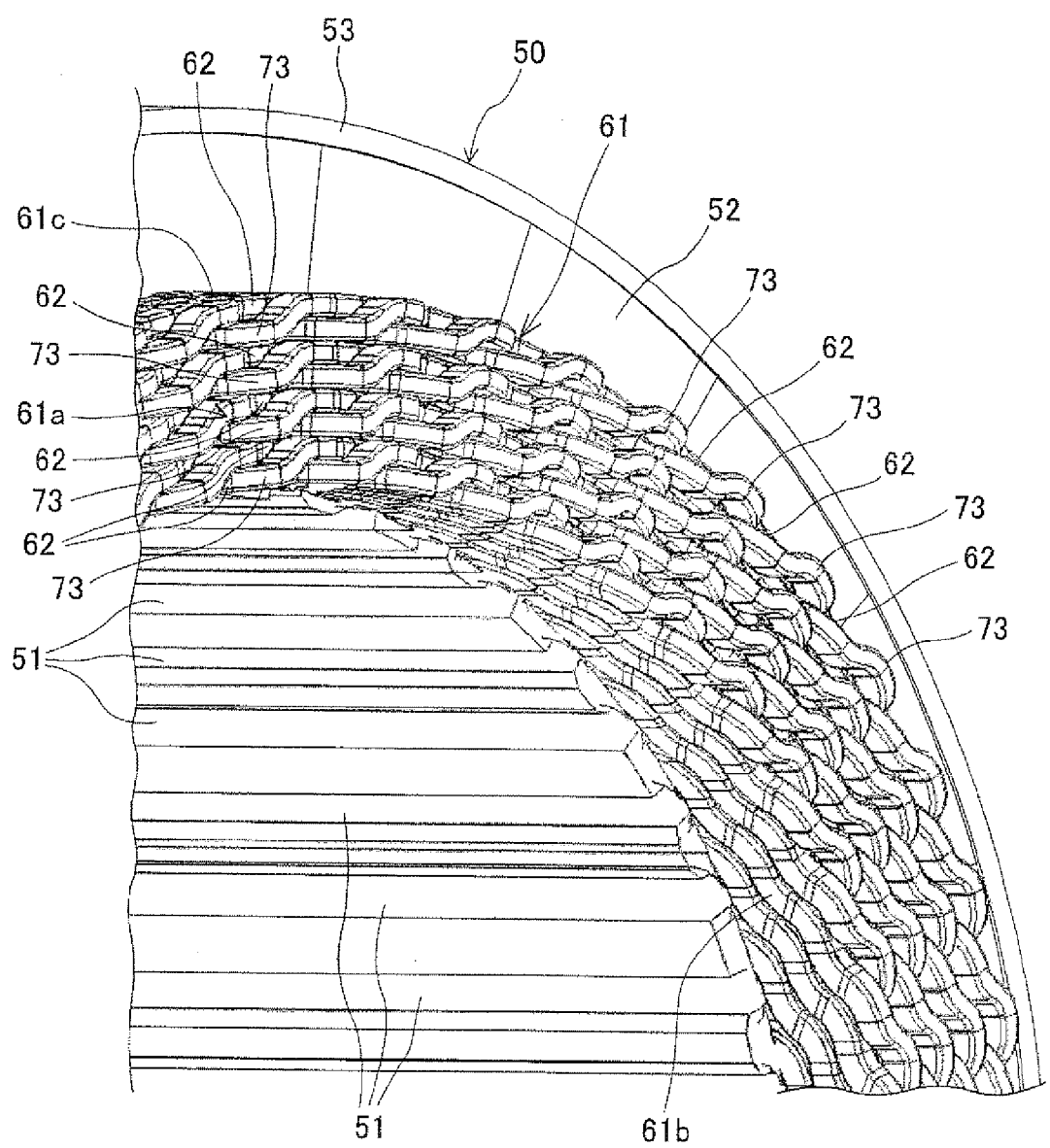
FIG. 8 is a partial perspective view of the stator of the electric rotating machine of the first embodiment.

Accordingly, as shown in FIG. 8, all the turn portions 72 are exposed at the axial end surfaces 61a of the coil end 61. Each turn portion 72 having the apex portion 73 at its center is indented along the direction in which it extends, and is distant in the circumferential direction by the slot pitch from the apex portion 73 of an adjacent one of the turn portions 72. Accordingly, there are formed concave grooves 62 which spread in a mesh-like pattern over the entire area of the axial end surface 61a of the coil end to make coolant passages between the inner and outer circumferential edges of the axial end surface 61a of the coil end 61.

Figure 9:
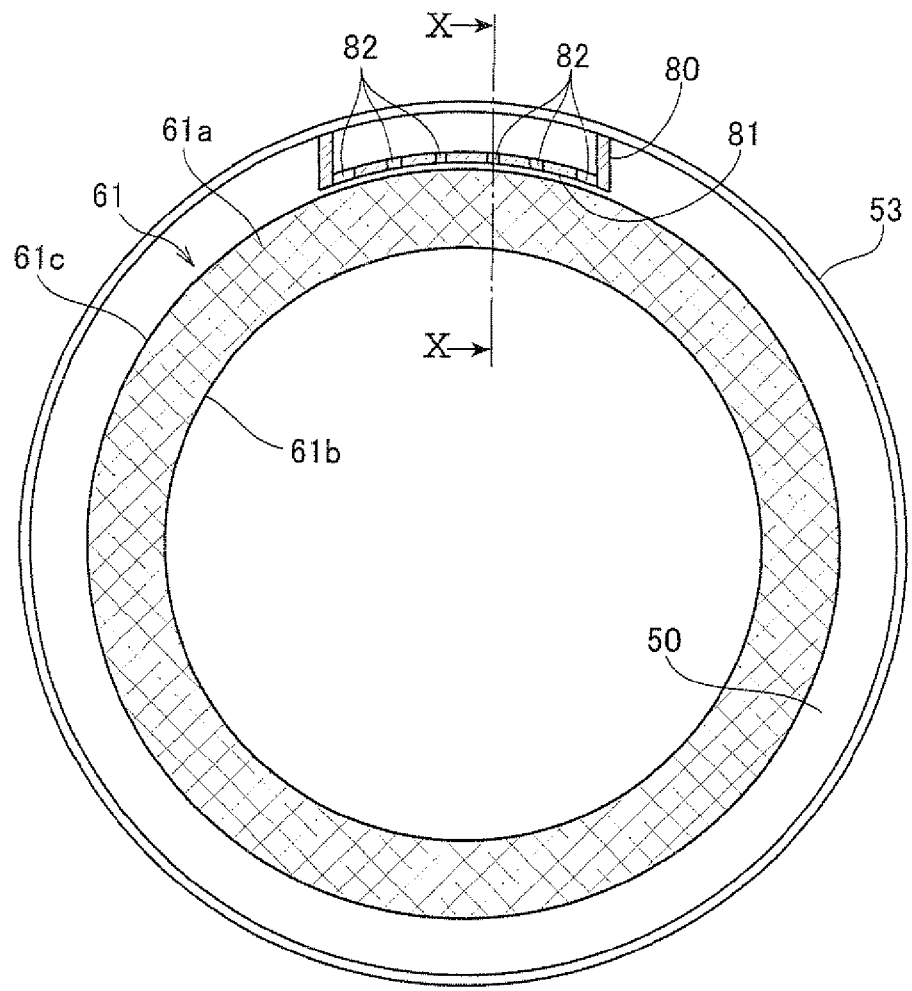
FIG. 9 is a front view of a coolant supply section installed on the stator core of the electric rotating machine of the first embodiment.
Figure 10:
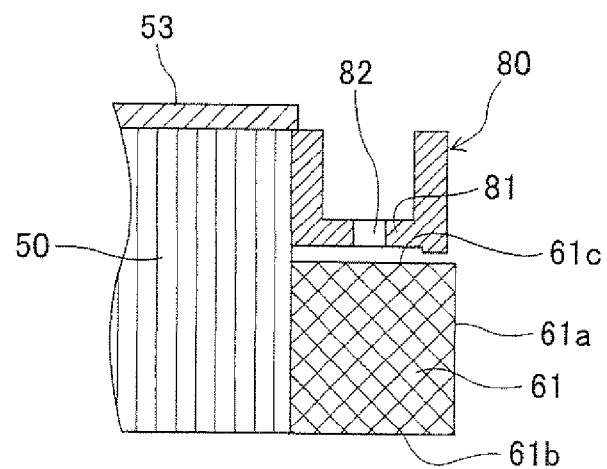
FIG. 10 is a cross-sectional view of FIG. 9 taken along the X-X line.

As shown in FIGS. 1 and 9, a coolant supply section 80 is provided above the outer peripheral surfaces 61c of the coil ends 61 to supply coolant to the uppermost part of the outer peripheral surfaces 61c of the coil ends 61. The coolant supply section 80 is constituted of a member to receive coolant, the member having an inlet opening through which coolant flows in at its upper end. The coolant supply section 80 is fixed to the end surface of the stator core 50 at one axial end sidewall thereof by screws (not shown). The coolant supply section 80 includes a bottom wall 81 extending in an arc shape in the circumferential direction with a predetermined distance (approximately 2 mm) from the outer periphery 61c of the coil end 61. The bottom wall 81 is formed with a plurality of discharge holes 82 arranged along the circumferential direction to discharge coolant to the outer periphery 61c of the coil end 61. In this embodiment, the discharged holes 82 of the same size are formed at six equally spaced positions along the circumferential direction.

Coolant discharged to the outer periphery 61c of the coil end 61 from the discharge holes 82 of the coolant supply section 80 passes the outer periphery 61c, axial end surface 61a and inner periphery 61b of the coil end 61, drops on the bottom part of the housing 10, and trapped there. Coolant trapped in the bottom part of the housing 10 is sucked by the pump 90 and supplied to a passage 14 formed in the main body section 11 of the housing 10 through a reservoir 91 provided in the lid section 13 of the housing 10. Thereafter, coolant is supplied to the coolant supply sections 80 through supply openings 14a formed in the passage 14. As explained above, this embodiment is configured to circulate coolant. Incidentally, the lower part of the coil end 61 is dipped in coolant trapped in the housing 10.

When the electric rotating machine having the above described structure starts to operate, coolant is supplied to the uppermost part of each of the coil ends 61 through the discharge holes 82 of each of the coolant supply sections 80 by the action of the pump 90. The supplied coolant flows downward from the uppermost part of the outer periphery 61c of each of the coolant supply sections 80. The supplied coolant flows also to the axial end surface 61a, and flows downward from there through the concave grooves 62 formed in a mesh-like pattern in the axial end surface 61a. Part of the coolant flowing from the uppermost part of the outer periphery 61c to the axial end surface 61a further flows to the inner periphery 61b, and flows downward along the inner periphery 61b. Hence, since coolant flows over the entire surface of the coil end 61, the whole of the coil end 61 can be cooled efficiently and reliably.

As explained above, the electric rotating machine of this embodiment has the structure in which coolant is supplied from the coolant supply sections 80 to the uppermost parts of the outer peripheral surfaces 61c of the coil ends 61 each formed in a cylindrical shape including the flat axial end surface 61a and the circular inner and outer peripheral surfaces 61a and 61b. This structure enables to produce flows of coolant spreading over the entire surface of the coil end 61 by the action of the gravity. Accordingly, the electric rotating machine of this embodiment exhibits high coil-end cooling performance.

Further, since the concave grooves 62 which spread in a mesh-like pattern are formed in the axial end surface 61a of the coil end 61 to make coolant passages between the inner and outer circumferential edges of the axial end surface 61a of the coil end 61, coolant can flow over the entire area of the axial end surface 61a. Accordingly, the entire area of the axial end surface 61a can be cooled efficiently by coolant flowing through the concave grooves 62. Further, since the concave grooves 62 are formed in a mesh-like pattern, and accordingly, coolant flowing through the concave grooves 62 can easily move toward the side of the inner circumferential edge of the axial end surface 61a, it is possible to supply coolant to the inner periphery 61b of the coil end 61 in sufficient amount.

Further, since all the turn portions 72 are exposed at either one of the axial end surfaces 61a of the coil ends 61, all the coil wires 70 can be cooled reliably by cooling the axial end surfaces 61a by heat conduction.

Second Embodiment

Next, an electric rotating machine according to a second embodiment of the invention is described with reference to FIGS. 11 to 13. The second embodiment differs from the first embodiment in that, in the second embodiment, guide sections 85 to guide coolant supplied to the outer periphery 61c are added to the coolant supply section 80, and the discharge holes 82 are provided in the coolant supply section 80 differently from the first embodiment. Accordingly the following description focuses on the differences with the first embodiment, and parts that are the same as those shown in previous figures are given the same reference numerals or characters and are not described again, except as necessary for an understanding of the present embodiment.

Figure 11:
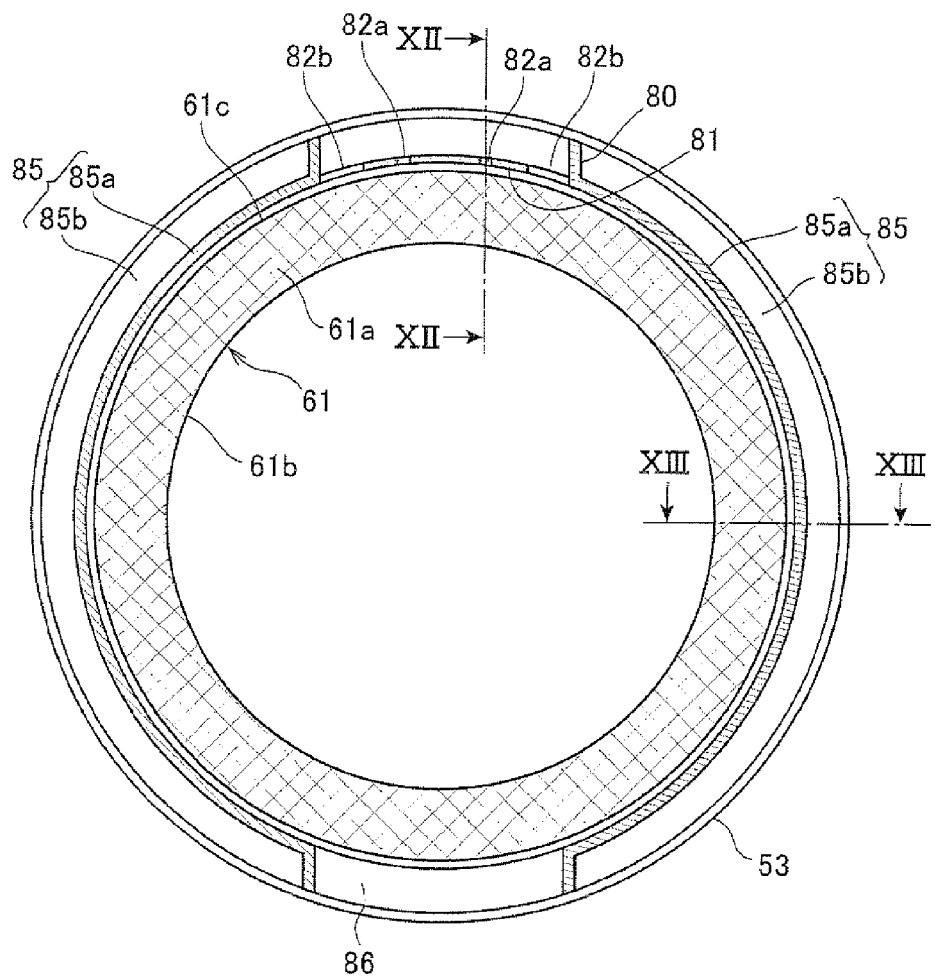
FIG. 11 is a front view of a coolant supply section including a guide section installed on a stator core of an electric rotating machine according to a second embodiment of the invention.
Figure 12A:
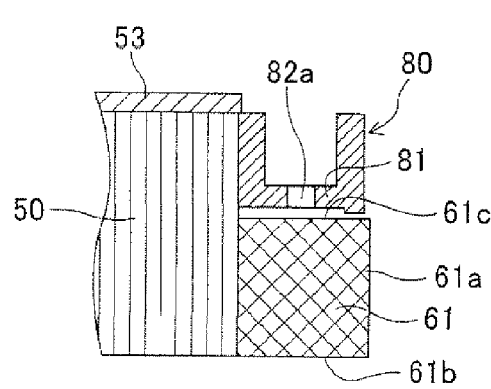
FIG. 12A is a cross-sectional view of FIG. 11 taken along the XII-XII line.
Figure 12B:
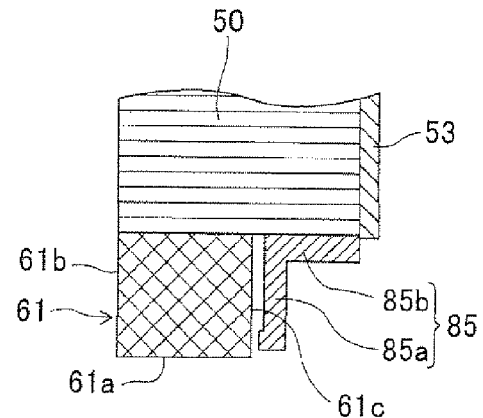

As shown in FIGS. 11, 12A and 12B, in this embodiment, the coolant supply section 80 is integrally provided with a pair of the guide sections 85 to guide coolant supplied from the discharge holes 82 of the coolant supply section 80 to the outer peripheral surface 61c of the coil end 61. Each guide section 85 includes a guide plate 85a of an arc-curved shape extending circumferentially downward from one circumferential end of the bottom wall 81 of the coolant supply section 80, and an arc-shaped sidewall 85b joined to one axial end of the guide plate 85a on the side of the end surface of the stator core 50. Accordingly, the guide section 85 has a roughly L-shaped cross section.

The guide section 85 is fixed to the end surface of the stator core 50 at its sidewall 85b by screws so as to be opposite to the outer peripheral surface 61c of the coil end 61 with a predetermined distance (approximately, 2 mm). The lowermost end of the guide section 85 is at a position somewhat above the lowermost part of the outer periphery 61c of the coil end 61. Between the lowermost ends of the pair of the guide sections 85, there is provided a discharge opening 86 through which coolant flowing downward along the surface of the coil end 61 is discharged.

Figure 13:
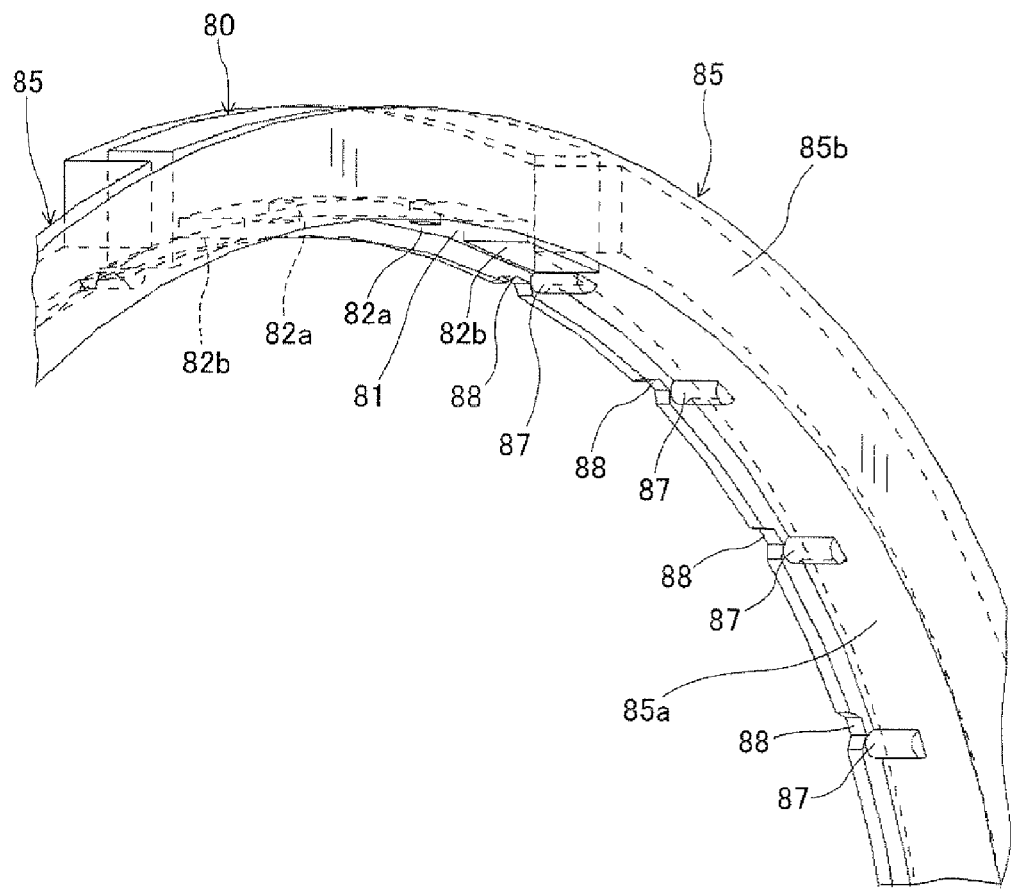
FIG. 13 is a perspective view of the coolant supply section shown in FIG. 11.

As shown in FIG. 13, the guide plate 85a is provided with a plurality of ribs 87 projecting axially inward and extending in the axial direction at an opposite surface (inner periphery) thereof which is opposite to the outer periphery 61c of the coil end 61. The ribs 87 are formed in the width-directional center portion of the guide plate 85a at even intervals. The ribs 87 increase the fluid resistance of the coolant flowing on the outer periphery 61c of the coil end 61 in their vicinities, to thereby produce coolant passages in the direction from the outer periphery 61c to the axial end surface 61a of the coil end 61.

The guide plate 85a is also formed with, at the opposite surface (inner periphery) thereof, notches 88 concaved radially outward and opening to the end surface thereof opposite to the sidewall 85b of the guide plate 85a. The notch 88 is provided adjacently and obliquely above a corresponding one of the ribs 87, so as to axially face the outer-peripheral side opening of a corresponding one of the concaved grooves 62 formed in the axial end surface 61a of the coil end 61. The notches 88 reduce the fluid resistance of the coolant flowing on the outer periphery 61c of the coil end 61 in their vicinities, to thereby produce coolant passages in the direction from the outer periphery 61c to the axial end surface 61a of the coil end 61.

In this embodiment, there are two types in the discharge holes 82 formed in the bottom wall 81 of the coolant supply section 80, a large-diameter type and a small-diameter type. Two each of the discharge holes 82 of the large-diameter type and the small-diameter type are provided. The two discharge holes 82 of the small-diameter type are formed at positions slightly deviated from the circumferentially center portion of the bottom wall 81. The two discharge holes 82 of the large-diameter type are formed at both circumferential ends of the bottom wall 81.

According to the second embodiment in which the coolant supply section 80 is provided with the guide section 85 disposed opposite to the outer periphery 61c of the coil end 61 with a predetermined distance, it is possible to guide downward coolant supplied to the uppermost portion of the outer periphery 61c of the coil end 61. Further, by increasing the fluid resistance of the coolant flowing on the outer periphery 61c of the coil end 61 in the vicinities of the ribs 87, it is possible to supply coolant from the outer periphery 61c to the axial end surface 61a of the coil end 61 in sufficient amount.

Further, by reducing the fluid resistance of the coolant flowing on the outer periphery 61c of the coil end 61 in the vicinities of the notches 87, it is possible to supply coolant from the outer periphery 61c to the axial end surface 61a of the coil end 61 in sufficient amount.

Since these ribs 87 and the notches 88 are provided at such positions that the ribs 87 increase the coolant flow resistance in their vicinities while the notches 88 reduce the coolant flow resistance in their vicinities, coolant passages toward the axial end surface 61a of the coil end 61 can be produced more efficiently, as a result of which a significant improvement in the cooling performance can be obtained.

Figure 14:
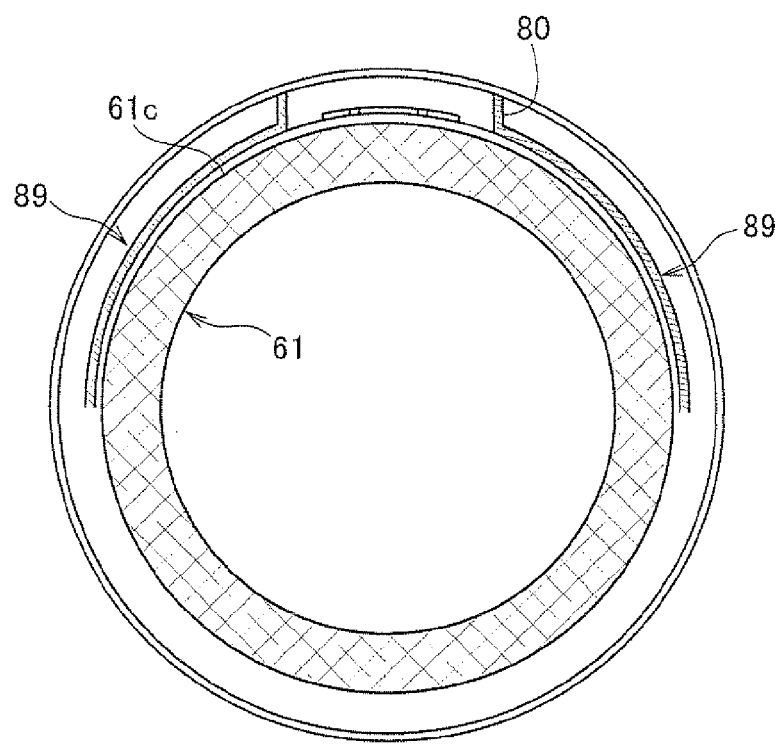
FIG. 14 is a front view of a coolant supply section including a guide section installed on a stator core of a first modification of the electric rotating machine according to the second embodiment of the invention.

In the second embodiment, a pair of the guide sections 85 are provided so as to cover the entire circumference of the outer periphery 61c of the coil end 61 except the coolant supply sections 80 and the discharge opening 86. However, the second embodiment may be modified such that a pair of guide sections 89 are provided to cover the upper half only of the outer periphery 61c of the coil end 61 for cost reduction as shown in FIG. 14.

Figure 15:
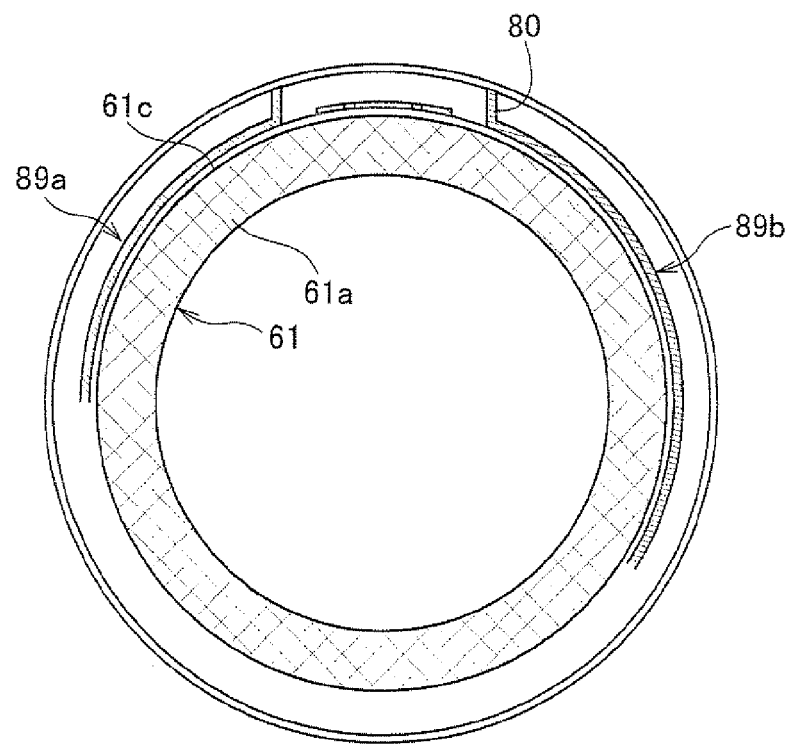
FIG. 15 is a front view of a coolant supply section including a guide section installed on a stator core of a second modification of the electric rotating machine according to the second embodiment of the invention.

The shape of the axial end surface 61a of the coil end 61 is not axially symmetrical, because the direction in which the turn portions 72 extend varies along the circumference. Accordingly, when two flows of coolant the directions from the center of the coolant supply section 80 toward both circumferential sides are uneven with each other, the second embodiment may be modified such that two guide sections 89a and 89b have different length to make them even with each other as shown in FIG. 15.

The above explained preferred embodiments are exemplary of the invention of the present application which is described solely by the claims appended below. It should be understood that modifications of the preferred embodiments may be made as would occur to one of skill in the art.

What is claimed is:

1. An electric rotating machine comprising:
    a rotor rotatable around a rotating shaft disposed horizontally;
    a stator core formed with a plurality of slots arranged in a circumferential direction of the stator core so as to be opposed to a peripheral surface of the rotor; and
    a stator coil constituted of a plurality of in-slot portions each of which is accommodated in a corresponding one of the plurality of the slots, and a plurality of turn portions each of which connects corresponding adjacent two of the plurality of the in-slot portions at a position outside the stator core, the plurality of the turn portions forming a coil end projecting axially outward from an end surface of the stator core at each of both axial end sides of the stator core, the coil end being formed in a cylindrical shape including an axial end surface of a flat shape, and inner and outer peripheral surfaces of a circular shape; and
    a coolant supply section to supply coolant to an upper part of the outer peripheral surface of the coil end, wherein
    the coolant supply section is provided with a guide section disposed opposite to the outer peripheral surface of the coil end with a predetermined distance to downwardly guide coolant supplied to the upper part of the outer peripheral surface of the coil end, and
    the guide section is provided with a rib projecting radially inward and extending axially at a surface thereof opposite to the outer peripheral surface of the coil end.

2. The electric rotating machine according to claim 1, wherein the axial end surface of the coil end is formed with a concaved groove spreading in a mesh-like pattern to make coolant passages between inner and outer circumferential edges of the axial end surface.

3. The electric rotating machine according to claim 1, wherein each of the plurality of the turn portions is exposed to the axial end surface of one of the coil ends.

4. The electric rotating machine according to claim 1, wherein each of the turn portions includes, at a center position thereof, an apex portion as a portion most axially distant from the end surface of the stator core.

5. The electric rotating machine according to claim 1, wherein the coolant supply section is formed with a plurality of discharge holes through which coolant is discharged to the upper part of the outer peripheral surface of the coil end.

6. The electric rotating machine according to claim 1, wherein the guide section is formed with a notch concaved radially outward and opening to an end surface of the guide section at a surface thereof opposite to the outer peripheral surface of the coil end.

7. The electric rotating machine according to claim 6, wherein the axial end surface of the coil end is formed with a concaved groove spreading in a mesh-like pattern to make coolant passages between inner and outer circumferential edges of the axial end surface.

8. The electric rotating machine according to claim 7, wherein the notch is formed at a position radially opposite to an opening of the groove on the side of the outer circumferential edge of the axial end surface of the coil end.

9. An electric rotating machine comprising:
- a rotor rotatable around a rotating shaft disposed horizontally;
- a stator core formed with a plurality of slots arranged in a circumferential direction of the stator core so as to be opposed to a peripheral surface of the rotor; and
- a stator coil constituted of a plurality of in-slot portions each of which is accommodated in a corresponding one of the plurality of the slots, and a plurality of turn portions each of which connects corresponding adjacent two of the plurality of the in-slot portions at a position outside the stator core, the plurality of the turn portions forming a coil end projecting axially outward from an end surface of the stator core at each of both axial end sides of the stator core, the coil end being formed in a cylindrical shape including an axial end surface of a flat shape, and inner and outer peripheral surfaces of a circular shape; and
- a coolant supply section to supply coolant to an upper part of the outer peripheral surface of the coil end, wherein
- the coolant supply section is provided with a guide section disposed opposite to the outer peripheral surface of the coil end with a predetermined distance to downwardly guide coolant supplied to the upper part of the outer peripheral surface of the coil end, and
- the guide section is formed with a notch concaved radially outward and opening to an end surface of the guide section at a surface thereof opposite to the outer peripheral surface of the coil end.

10. The electric rotating machine according to claim 9, wherein the axial end surface of the coil end is formed with a concaved groove spreading in a mesh-like pattern to make coolant passages between inner and outer circumferential edges of the axial end surface.

11. The electric rotating machine according to claim 10, wherein the notch is formed at a position radially opposite to an opening of the groove on the side of the outer circumferential edge of the axial end surface of the coil end.

* * * * *

UNITED STATES PATENT AND TRADEMARK OFFICE
CERTIFICATE OF CORRECTION

PATENT NO. : 8,247,934 B2  
APPLICATION NO. : 12/764231  
DATED : August 21, 2012  
INVENTOR(S) : Matsui et al.

Page 1 of 1

It is certified that error appears in the above-identified patent and that said Letters Patent is hereby corrected as shown below:

On the title page:

Item "(75) Inventors: Hirohito Matsui, Okazaki (JP); Sadahisa Onimaru, Chiryu (JP); Shinji Kouda, Kariya (JP); Ryosake Utaka, Takahama (JP); Munehiro Kamiya, Toyota (JP); Hiroshi Kaneiwa, Chiryu (JP)"

Should be Item --(75) Inventors: Hirohito Matsui, Okazaki (JP); Sadahisa Onimaru, Chiryu (JP); Shinji Kouda, Kariya (JP); Ryosuke Utaka, Takahama (JP); Munehiro Kamiya, Toyota (JP); Hiroshi Kaneiwa, Chiryu (JP)--

Signed and Sealed this  
Sixteenth Day of October, 2012

David J. Kappos  
*Director of the United States Patent and Trademark Office*